(12) United States Patent
Zadigian et al.

(10) Patent No.: US 9,361,262 B2
(45) Date of Patent: *Jun. 7, 2016

(54) REDUNDANT STORAGE ENCLOSURE PROCESSOR (SEP) IMPLEMENTATION FOR USE IN SERIAL ATTACHED SCSI (SAS) ENVIRONMENT

(71) Applicant: Dell Products L.P., Round Rock, TX (US)

(72) Inventors: Timothy M. Zadigian, Round Rock, TX (US); A. Jaime Martinez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,646

(22) Filed: May 11, 2015

(65) Prior Publication Data

US 2015/0242354 A1 Aug. 27, 2015

Related U.S. Application Data

(63) Continuation of application No. 11/469,250, filed on Aug. 31, 2006, now Pat. No. 9,058,306.

(51) Int. Cl.
| | | |
|---|---|---|
| *G06F 11/00* | (2006.01) | |
| *G06F 13/40* | (2006.01) | |
| *G06F 11/20* | (2006.01) | |
| *G06F 13/42* | (2006.01) | |

(52) U.S. Cl.
CPC ........ *G06F 13/4068* (2013.01); *G06F 11/2092* (2013.01); *G06F 13/4208* (2013.01)

(58) Field of Classification Search
CPC ............ G06F 11/2002; G06F 11/2023; G06F 11/2025; G06F 11/2028; G06F 11/2033; G06F 11/2069; G06F 11/2071
USPC .................................................. 714/5.11, 10
See application file for complete search history.

(56) References Cited

U.S. PATENT DOCUMENTS

| | | | |
|---|---|---|---|
| 5,790,775 A | 8/1998 | Marks et al. ....................... | 714/9 |
| 6,901,531 B2 | 5/2005 | Gilbert et al. ...................... | 714/5 |
| 7,028,106 B2 | 4/2006 | Foster et al. ....................... | 710/2 |
| 7,039,741 B2 | 5/2006 | Bakke et al. ................... | 710/300 |
| 7,093,033 B2 | 8/2006 | Beckett et al. ................... | 710/11 |
| 7,353,302 B2 | 4/2008 | Seto ............................... | 710/36 |

(Continued)

OTHER PUBLICATIONS

SCSI Standards, www.datapro.net/techinfo/scsi_doc.html, 10 pages.

*Primary Examiner* — Elmira Mehrmanesh
(74) *Attorney, Agent, or Firm* — Baker Botts L.L.P.

(57) ABSTRACT

An information handling system includes a storage enclosure operable to communicate with a storage initiator. The storage enclosure includes a first controller corresponding to a first storage domain for enabling access between the storage initiator and a plurality of storage targets using a storage protocol. A second controller of the system, corresponding to a second storage domain, is operable to enable access between the storage initiator and the plurality of storage targets. A second storage enclosure subsystem is part of the second controller and a second configurable extra-protocol interconnection between the second storage enclosure subsystem and the first controller enables the second storage enclosure subsystem to function as a storage enclosure subsystem for the first controller.

20 Claims, 4 Drawing Sheets

(56) References Cited

U.S. PATENT DOCUMENTS

| | | | |
|---|---|---|---|
| 7,356,728 B2 | 4/2008 | Tawil et al. | 714/5 |
| 7,377,800 B2 | 5/2008 | Gasser | 439/374 |
| 7,401,254 B2 | 7/2008 | Davies | 714/11 |
| 7,418,525 B2 | 8/2008 | Dalton et al. | 710/5 |
| 2004/0006587 A1 | 1/2004 | McConnell et al. | 709/202 |
| 2005/0066100 A1 | 3/2005 | Elliott et al. | 710/300 |
| 2005/0154826 A1 | 7/2005 | Marks et al. | 711/114 |
| 2005/0228943 A1 | 10/2005 | DeCenzo et al. | 711/114 |
| 2006/0136666 A1* | 6/2006 | Pang | G06F 3/0607 711/114 |
| 2006/0136688 A1 | 6/2006 | Pang et al. | 711/162 |
| 2006/0235937 A1 | 10/2006 | Wu et al. | 709/214 |
| 2007/0088978 A1 | 4/2007 | Lucas et al. | 714/9 |
| 2008/0126849 A1* | 5/2008 | Kotzur | G06F 11/2094 714/6.32 |

* cited by examiner

REDUNDANT STORAGE ENCLOSURE PROCESSOR (SEP) IMPLEMENTATION FOR USE IN SERIAL ATTACHED SCSI (SAS) ENVIRONMENT

CROSS-REFERENCE TO RELATED APPLICATIONS

This application is a continuation of pending U.S. patent application Ser. No. 11/469,250 filed Aug. 31, 2006, now U.S. Pat. No. 9,058,306, the contents of which is incorporated herewith in its entirety by reference.

TECHNICAL FIELD

The present invention is related to the storage technology and, more specifically, an implementation of a serial attached SCSI storage enclosure for use as part of an information handling system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems frequently include a source of persistent mass storage. A persistent mass storage provides storage for data and program code, including operating system code that persists across power tenures. In addition, persistent mass storage facilitates virtual memory systems in which only portions of an application or data structure reside in system memory at any given time while the remainder of the application or data structure resides in persistent storage as is well known in the field of information handling systems.

The predominant interface for connecting persistent mass storage devices in desktop systems is the Advanced Technology Attachment (ATA). ATA, also referred to as IDE, and other acronyms, began as a parallel interface (parallel ATA or PATA), but has evolved recently into higher performing Serial ATA (SATA). While PATA and, more recently, SATA devices are adequate for consumer systems, SCSI provides a higher performance interface suitable for use in high end server systems, JBOD (just a bunch of disks) storage systems, and RAID (redundant array of inexpensive/independent disks) storage systems.

As of 2003, there have been three "official" SCSI standards: SCSI-1, SCSI-2, and SCSI-3. All SCSI standards have been modular in the sense that they define various capabilities which manufacturers may, but are not required to, include. Starting with SCSI-3, the SCSI standard has been maintained as a loose collection of standards. Each of these standards defines a specific piece of the SCSI architecture. The individual standards are and bound together by a SCSI Architectural Model. The use of a modular standard frees SCSI's various interfaces from the command set, thereby allowing devices that support SCSI commands to use any interface.

Serial Attached SCSI (SAS) breaks from the traditional parallel SCSI standard and performs data transfer via serial communications. Serial SCSI has number of advantages over parallel SCSI including faster data rates, hot swapping, and improved fault isolation. SAS supports up to 16K addressable devices in an SAS domain and point to point data transfer speeds currently approaching 3 Gbit/s, but expected to reach 10 Gbit/s soon. A SAS connector is significantly smaller than traditional parallel SCSI connectors allowing for small 2.5 inch drives.

A SAS domain is a set of SAS ports communicating with each other. A SAS domain contains one or more SAS devices and a service delivery subsystem. A SAS domain may be a SCSI domain. Each SAS device is assigned a World Wide Name (SAS address) assigned by IEEE for the particular vendor. The WWN uniquely identifies the device in an SAS domain just as a SCSI ID identifies a device in a parallel SCSI bus.

Expander devices are part of the SAS service delivery subsystem, itself part of a SAS domain, and facilitate communication between multiple SAS devices. Expander devices contain two or more external expander ports. Each expander device contains at least one target port for management and may contain SAS devices itself. For example, an expander device may include an SSP target port for access to a logical unit with a peripheral device type set to 0 Dh (i.e., enclosure services device).

Expanders connect to SAS targets, SAS initiators, SAS target/initiator devices, or to other Expanders. Expanders are not SAS devices, but are part of the SAS domain's service delivery subsystem. An Edge Expander is a type of SAS Expander that provides a connection for as many as 128 SAS devices, i.e., SAS addresses.

SAS is frequently implemented as a SAS enclosure. The enclosure may include two SAS controllers where each controller represents a SAS domain. Each controller may have its own management/monitoring engine, referred to herein as a Storage Enclosure Processor (SEP). In a conventional implementation, however, SAS prohibitions on connections between SAS domains prevent the implementation of a SAS connection between a SEP on a first controller and the SEP on a second controller. If one of the SEP's fails, the lack of a connection between the SAS initiator and the non-failing SEP prevents the use of the non-failing SEP as a backup or redundant SEP and the management capability of the enclosure is negatively impacted. While loss of management capability does not result in direct data loss, it can result in degraded performance when storage configuration changes cannot be relayed to the host.

SUMMARY OF THE INVENTION

Therefore a need has arisen for a system and method for providing a fully redundant storage enclosure in a point to point protocol environment.

The present disclosure describes a system and method for providing for redundant backup of the enclosure management subsystem in a point to point protocol storage environment.

In one aspect, a disclosed storage enclosure includes a first and second storage controller. The first storage controller enables a storage initiator to access a plurality of storage targets. The first controller has an enclosure management subsystem including a first storage enclosure processor (SEP). The second storage controller is also capable of enabling the storage initiator to access the plurality of storage targets and it also has an enclosure management subsystem including a second SEP.

Switching circuitry of the storage enclosure is operable to connect the first storage controller to either the first SEP or the second SEP using a non storage connection—a connection that is of a different protocol than the interconnections between the storage initiator and the storage targets. The second SEP responds to detecting a failure of the first SEP by controlling the switching circuitry to connect the second SEP to the first storage controller. and disconnect the first SEP from the first storage controller.

In another aspect a disclosed includes operably connecting a first storage enclosure processor (SEP) to an expander of a first storage controller and a second SEP to an expander of a second storage controller following a storage enclosure reset. A functional status of the first SEP is then monitored. Responsive to detecting a failure of the first SEP, the second SEP is connected to the expander of the first controller using an interconnect that is not visible to a storage initiator connected to the first storage enclosure.

Monitoring the functional status may include monitoring a heartbeat signal of the first SEP. The storage initiator may be connected to the first controller with a serial attached SCSI (SAS) interconnect and connecting to the first SEP may include configuring a first I2C switch to connect the first SEP to the expander of the first storage controller via an I2C interconnect. Connecting the second SEP to the expander may include the second SEP asserting a first control to the first I2C switch and asserting a second control signal to a second I2C switch. The first I2C switch may be on the first controller and the second I2C switch may be on the second switch In yet another aspect, a disclosed information handling system includes a storage enclosure operable to communicate with a storage initiator. The storage enclosure includes a first controller corresponding to a first storage domain for enabling access between the storage initiator and a plurality of storage targets using a storage protocol. A second controller of the system, corresponding to a second storage domain, is operable to enable access between the storage initiator and the plurality of storage targets. A second storage enclosure subsystem is part of the second controller and a second configurable extra-protocol interconnection between the second storage enclosure subsystem and the first controller enables the second storage enclosure subsystem to function as a storage enclosure subsystem for the first controller.

The present disclosure includes a number of important technical advantages. One technical advantage is the ability to maintain management capability in an external point-to-point storage enclosure following failure of a single storage enclosure processor. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
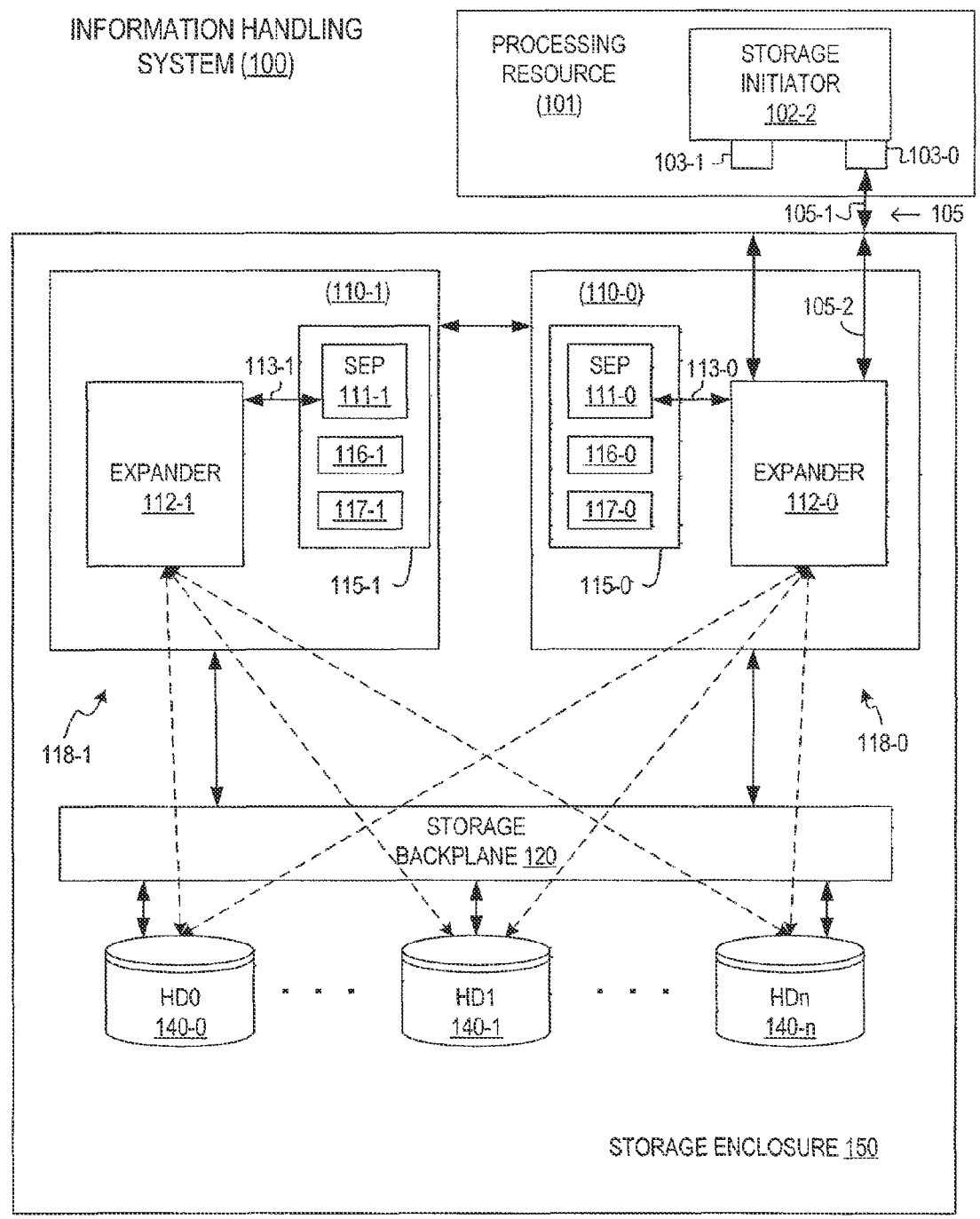
FIG. 1 shows an embodiment of a dual controller storage enclosure for use in an information handling system.

Preferred embodiments of the invention and its advantages are best understood by reference to FIG. 1 through FIG. 4 wherein like numbers refer to like and corresponding parts. Throughout this specification instances of elements are indicated by a hyphenated reference numeral such that, for example, reference numerals 10-1 and 10-2 would identify first and second instances of element 10. In such instances, the unhyphenated reference may be used to indicate any or all of the instances generically or collectively.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Now referring to FIG. 1, one implementation of an information handling system 100 is depicted. As depicted in FIG. 1, IHS 100 includes a processing resource 101 and a dual controller storage enclosure 150. Processing resource 101 includes a dual port storage initiator 102 including ports 103-0 and 103-1. Storage enclosure 150 includes a first storage controller 110-0 and a second storage controller 110-1, generically or collectively referred to herein as controller(s) 110. Each controller 110 services storage requests initiated by storage initiator 102 and directed to one of a plurality of storage targets 140-0 through 140-2, generically or collectively referred to herein as storage target(s) 140. Although FIG. 1 illustrates three storage targets, storage enclosure 150 may include more or fewer targets 140. For example, the number of storage targets 140 in a SAS implementation of storage enclosure 150 may be any number less than 16,348 (16K). Each storage target 140 is preferably implemented as a hard disk device. A storage back plane 120 provides a physical interface between controllers 110 and storage targets 140.

As depicted in FIG. 1, first storage controller 110-0 includes a first storage expander 112-0 that enables storage initiator 102 to communicate with the plurality of storage targets 140. In addition, first storage controller 110-0 includes a first enclosure management subsystem 115-0. Enclosure management subsystem 115-0 as depicted includes a first storage enclosure processor (SEP) 111-0 and support circuitry including, as examples, flash memory 116-0 and field programmable gate array (FPGA) 117-0. First SEP 111-0 is preferably an embedded or general purpose processor configured to facilitate management and configuration of first storage controller 110-0. Similarly, second storage controller 110-1 has a corresponding expander 112-1 and enclosure subsystem 115-1 including a second SEP 111-1, flash memory 116-1 and FPGA 117-1.

In the depicted implementation, each SEP 111 is connected to a corresponding expander 112. First expander 112-0 is also connected to a first port 103-0 on storage initiator 102 by a storage interconnection 105 between ports 103-0 and expander 112-0. Storage interconnection 105 is preferably implemented as a high speed interconnection, which is defined herein as an interconnection capable of supporting a data transfer rate exceeding 10 Mbps. Storage interconnection 105 as depicted in FIG. 1 may include two or more interconnection sections including an external first interconnection 105-1 from port 103-0 to storage enclosure 150 and an internal interconnection 105-2 from a chassis of storage enclosure 150 to expander 112-0. In serial attached SCSI (SAS) compliant embodiments of storage enclosure 150, interconnections 105 may include SAS x4 interconnection cables.

In one embodiment, an interconnection 113-0 between first SEP 111-0 and first expander 112-0 is implemented as a low speed interconnection. For purposes of this disclosure, a low speed interconnection is defined as an interconnection not capable of supporting data transfer rates exceeding 10 Mbps. Interconnection 113-0 is implemented in one embodiment as an I2C (Inter Integrated Circuit) bus. An I2C bus is a well known and widely pervasive, two-wire bi-direction serial bus for inter IC control. In this embodiment, interconnection 113-0 is preferably compliant with the I2C-Bus Specification, Version 2.1 (or later), published by Phillips Semiconductor.

In a SAS compliant embodiment of storage enclosure 150, first storage controller 110-0 corresponds to a first SAS domain represented by reference numeral 118-0 while storage controller 110-1 corresponds to a second SAS domain 118-1. Thus, interconnection 113-0 connects first SEP 111-0 directly to first SAS domain 118-0. Similarly, second SEP 111-1 of storage controller 110-1 is directly connected to second SAS domain 118-1 by interconnection 113-1.

In SAS compliant implementations, the point-to-point architecture of SAS presents a limitation on the implementation of complete redundancy. In a fully redundant design, it would be desirable if a failure of first SEP 111-0 or any part of enclosure management subsystem 115-0 that prevents first SEP 111-0 from responding to storage management requests were addressed by effectively replacing first SEP 111-0 with second SEP 111-1 on first storage controller 110-0. Because the SAS architecture strictly prohibits inter-domain connections however, it is not possible to use a SAS interconnection between first and second controllers 110-0 and 110-1. In the absence of an inter-controller connection, it is not possible for first storage controller 110-0 to use second SEP 111-1 as a backup processor for first SEP 111-0.

Figure 2:
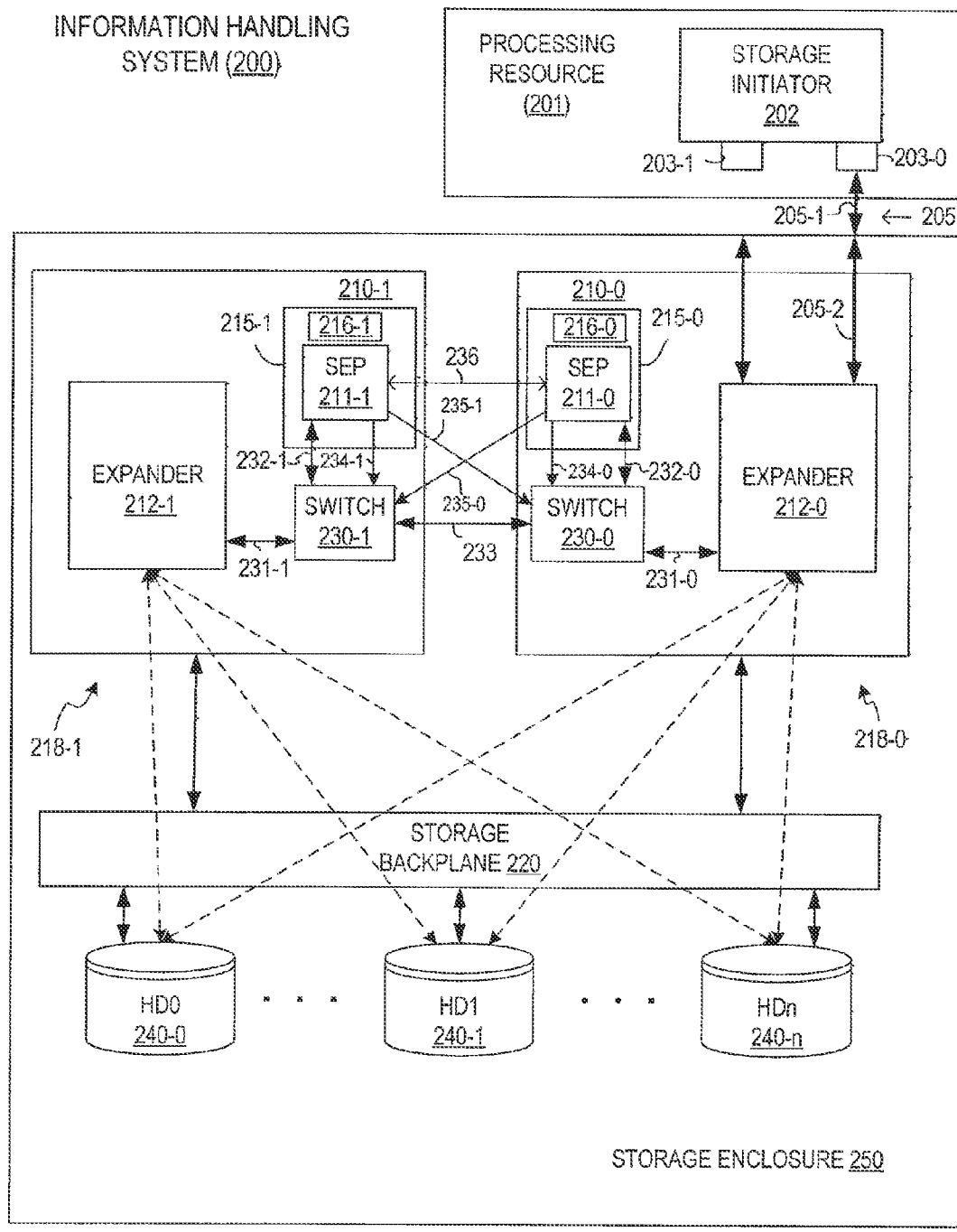
FIG. 2 shows another embodiment of a dual controller storage enclosure emphasizing switches to implement redundancy for storage enclosure processors (SEPs)

Referring now to FIG. 2, an embodiment of an information handling system 200 addressing the enclosure management redundancy problem described above is illustrated. Information handling system 200 includes a dual controller storage enclosure 250 that achieves SEP redundancy by providing a configurable interconnection between either of the dual storage controllers and either of the SEPs. Whereas the storage controllers use a storage interconnection to communicate commands and data between storage initiator 202 and storage targets 240, storage enclosure 250 implements the configurable interconnection to the SEPs using an extra-protocol interconnection where extra-protocol interconnection means an interconnection protocol that would not support communication to storage targets 240. The storage interconnection protocol is preferably a high speed and point to point interconnection such as a SAS interconnection whereas the configurable interconnection to the SEPs may be implemented with a low speed, shared bus interconnection such as an I2C bus. Desirably, in a point to point storage environment, the configurable connection to the SEP's is not visible to the storage controllers, thereby preserving domain isolation.

The depicted embodiment of IHS 200 includes a processing resource 201 having a dual port storage initiator 202 including ports 203-0 and 203-1.

Figure 3:
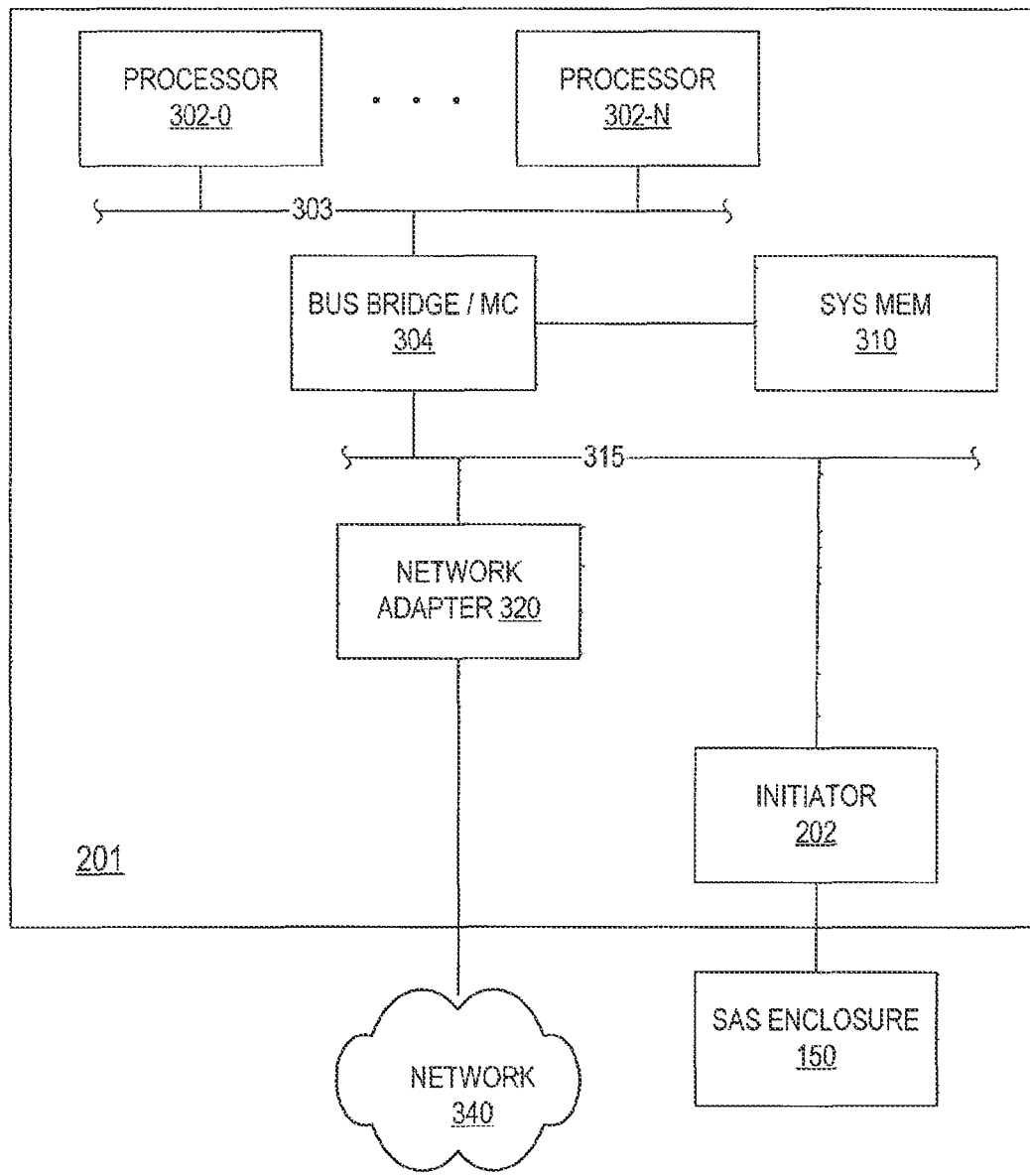
FIG. 3 is a block diagram illustrating selected elements of a processing resource suitable for use in the information handling system of FIG. 1 and/or FIG. 2.

Referring to FIG. 3, selected elements of an exemplary processing resource 201 are illustrated. In the depicted embodiment, processing resource 201 includes one or more processors 302-0 through 302-N (generically or collectively referred to as processor(s) 302) sharing a system bus or local bus 303 with a bus bridge/memory controller 304. A system memory 310 is connected to bus bridge/memory controller 304 providing shared access to system memory 310 by processors 302. This architecture is typical of symmetric multiprocessor (SMP) designs, which are characteristic of many server class processing resources. Bus bridge /memory controller 304, although depicted as a single entity, may be implemented as multiple components including, as an example, a north bridge and a south bridge that will be familiar to those skilled in the field of microprocessor-based system design.

A peripheral bus 315 provided by bus bridge 304 enables peripheral devices, also referred to as I/O devices, to connect to processing resource 201. In the depicted embodiment, a network adapter 320 provides an interface to a network 340, which could be a local network (e.g., a LAN) or a wide area network such as the Internet. Storage initiator 202 is shown as being connected to peripheral bus 315, which may be a PCI bus or another suitable peripheral bus.

Processing resource 201 may be implemented as a modular resource suitable for insertion into a rack-based chassis with one or more other such resources. Alternatively, processing resource 201 may be implemented as a monolithic resource with its own chassis. Although FIG. 3 suggests a particular implementation for processing resource 201, other implementations may also be used. For example, although processing resource 201 is depicted in FIG. 3 as an SMP resource, other embodiments may use a non-symmetric or distributed architecture such as a non-uniform memory architecture (NUMA) design.

Returning to FIG. 2, A storage enclosure 250 is connected to port 203-0 via a storage interconnection 205. Storage enclosure 250 is a dual controller storage enclosure including first storage controller 210-0 of a first SAS domain 218-0 and second storage controller 210-1 of a second SAS domain 218-1. Each storage controller 210 includes a corresponding storage expander 212 and an enclosure management subsystem 215 including a SEP 211. Storage expanders 212 enable storage initiator 202 to access a plurality of storage targets 240. A storage backplane 220 provides a physical interface between storage controllers 210 and a plurality of storage targets 240.

In contrast to the embodiment depicted in FIG. 1, however, storage enclosure 250 as depicted in FIG. 2 includes a first switch 230-0 on first controller 210-0 and a second switch 230-1 on second controller 210-1. Storage enclosure 250 as shown further includes an interconnection 231-0 between first expander 212-0 and first switch 230-0, an interconnection 232-0 between first SEP 211-0 and first switch 230-0, and an interconnection 233 between first switch 230-0 on first controller 210-0 and second switch 230-1 on second controller 210-1.

Similarly, storage enclosure 250 as shown further includes an interconnection 231-1 between second expander 212-1 and second switch 230-1 and an interconnection 232-1 between second SEP 211-1 and second switch 230-1. First SEP 211-0 is configured to issue at least one control signal 234-0 to first switch 230-0 and at least one control signal 235-0 to second switch 230-1. Second SEP 211-1 is configured to issue at least one control signal 234-1 to second switch 230-1 and at least one control signal 235-1 to first switch 230-0. Moreover, a heartbeat signal 236 is implemented between first SEP 211-0 and second SEP 211-1. Heartbeat signal 236 enables each SEP 211 to monitor the functional status of the other SEP.

In one embodiment, switches 230 are I2C compliant switches and interconnections 231, 232, and 233 are I2C compliant interconnections. Each SEP 211 is configured to control the switches 230 to connect a functional SEP to one of the controllers 210. In a typical application using this implementation, first storage controller 210-0 is the primary controller and first SEP 211-0 is the primary SEP. The primary controller and SEP refer to the controller and SEP that are activated by default following a reset of storage enclosure 250. In the context of the depicted embodiment, these default settings are achieved by appropriate settings of switches 230. Following reset, for example, first switch 230-0 connects first SEP 211-0 to first expander 212-0 and "opens" interconnection 233 so that second switch 230-1 and first controller 210-0 are disconnected.

If first enclosure subsystem 215-0 fails during operation and thereby prevents first SEP 211-0 from responding to storage management requests, second SEP 211-1 will detect the failure via heartbeat signal 236 and take corrective action. Specifically, second SEP 211-1 will assert control signals 234-1 and 235-1 to alter the settings of first switch 230-0 and second switch 230-1 so that second SEP 211-1 is connected to first expander 212-0 via interconnections 232-1, 233, and 231-0 and first SEP 211-0 is disconnected or otherwise isolated from first expander 212-0). In this manner, second SEP 211-1 provides a redundant backup for first SEP 211-0 when first SEP 211-0 is the primary SEP and vice versa. This configuration enables a functional replacement of the SEP without knowledge or input from the host storage controller thereby allowing the storage controller 210 to run without interruption in the event of an enclosure management subsystem failure. Moreover, storage enclosure 250 remains fully manageable when a SEP fails.

Embodiments of the invention may be implemented as a set of processor executable instructions stored on a computer readable medium such as the flash memory circuits 216-0 and 216-1 depicted in FIG. 2. The storage medium could also be a portable storage medium such as a CD, DVD, magnetic tape, or the like. When executed by a processor such as a SEP 211, the instructions perform a process 400 for responding to an enclosure management subsystem failure in a storage enclosure such as storage enclosure 250. An exemplary implementation of process 400 is illustrated by the flow diagram of FIG. 4. In the illustrated implementation, process 400 is initiated when storage enclosure 250 is reset (block 402). Following reset, SEP switches 230 as shown in FIG. 2 are initialized (block 404) to their default settings or positions. The default settings connect each SEP 211 to the expander 212 on the same controller 210. In other words, first SEP 211-0 is connected by default to first expander 212-0 on first controller 210-0 and second SEP 211-1 is connected by default to second expander 212-1 on second controller 210-1. In addition, following reset, first SEP 211-0 is designated as the primary SEP and second SEP 211-1 is designated as the secondary SEP.

Following the default setting of switches 230, the status of each SEP is monitored (block 406) by the other SEP using, for example, the heartbeat signal 236. If (block 408) the secondary SEP fails, the status of the secondary SEP is set (block 410) to Unavailable. If a failure of the primary SEP is detected (block 412), the status of the secondary SEP is determined (block 414). If the secondary SEP is unavailable, the method is terminated with an error message (block 416) indicating that the storage enclosure management subsystems are nonfunctioning.

Figure 4:
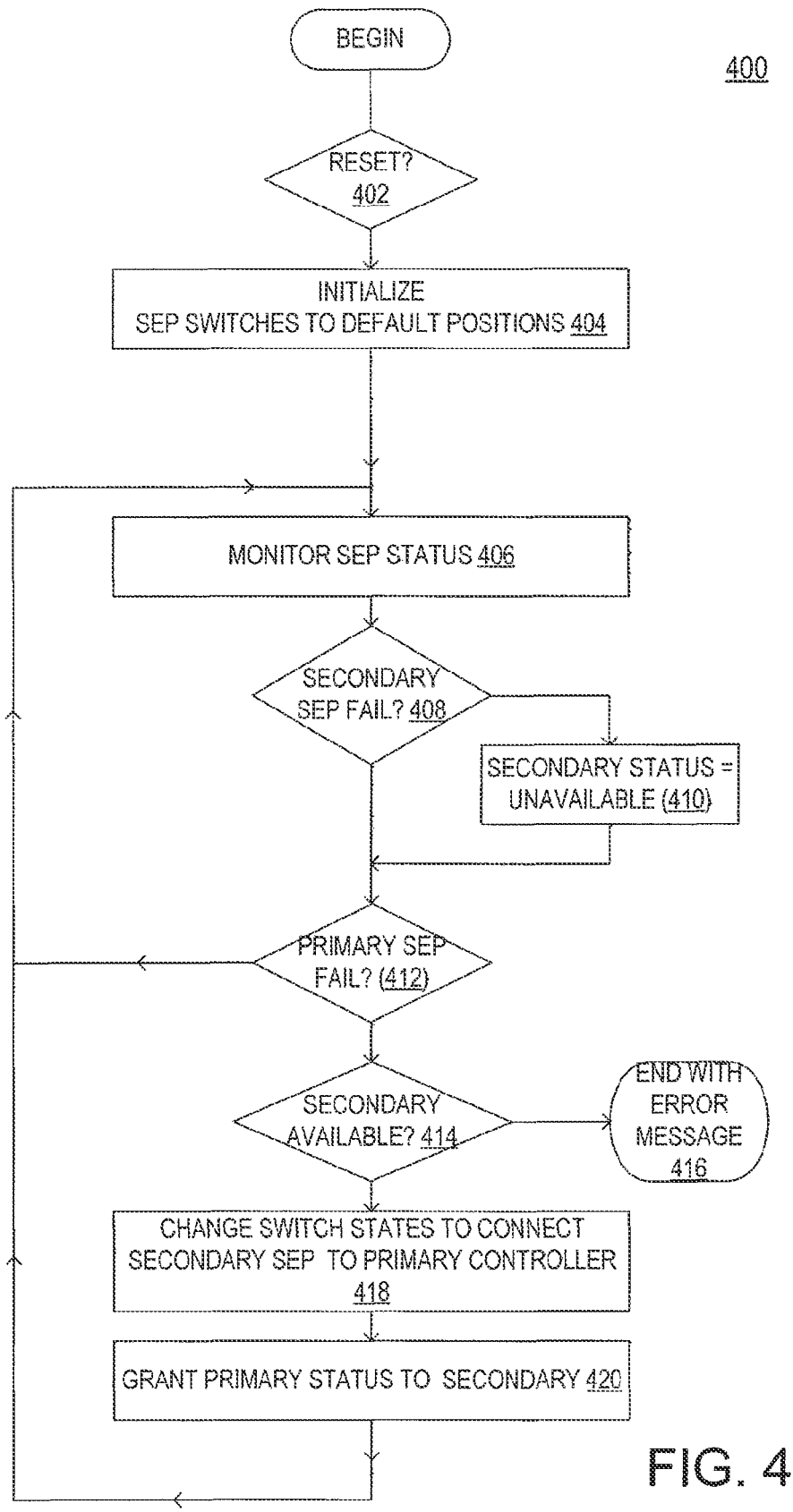
FIG. 4 is a flow diagram illustrating selected elements of a process for providing a redundant backup for a failed primary storage enclosure processor.

If the status of the secondary SEP is verified in block 414, the state of switches 230 is altered (block 418) to connect the secondary SEP to the primary controller and, more specifically with respect to the implementation depicted in FIG. 2, to disconnect the secondary SEP from the second expander 212-1 and to connect the secondary SEP to the first expander 212-0. Thereafter, the status of the secondary SEP is changed to reflect the SEP as the primary SEP. Although the depicted embodiment of process 400 shows a series of process steps occurring in a prescribed order, it will be appreciated that the other embodiments may alter the sequencing of steps indicated without altering the functional result of method 400. For example, method 400 is depicted in FIG. 4 as checking the status of the secondary SEP before checking the status of the primary. Other embodiments may check the status of the primary SEP first on the theory that SEP failures are relatively rare.

Thus, the illustrated embodiments described above are effective in providing a redundant backup for the management subsystem in a dual controller storage enclosure such as a SAS storage enclosure where direct redundancy via the storage bus is prohibited.

Although the disclosed embodiments have been described in detail, it should be understood that various changes, substitutions and alterations can be made to the embodiments without departing from their spirit and scope

What is claimed is:

1. An information handling system, comprising:
a storage enclosure, comprising:
 a first storage controller for enabling a single storage initiator to access a plurality of storage targets and including a first storage enclosure processor (SEP);
 a second storage controller for enabling the single storage initiator to access the plurality of storage targets and including a second SEP; and
 a switching circuitry that includes a first switch on the first storage controller and a second switch on the second storage controller, wherein the switching circuitry is operable to connect the first storage controller to either the first SEP or the second SEP via a non-storage interconnection, wherein the first SEP is operable to assert control signals to the first and second switches and the second SEP is operable to assert control signals to the first and second switches.

2. The information handling system of claim 1, wherein the single storage initiator is configured to initiate a storage request directed to the plurality of storage targets.

3. The information handling system of claim 2, further comprising a single storage interconnection between the storage initiator and the storage enclosure, the switching circuitry configured to allow communications between the storage initiator and either of the first and second storage controller via the single storage interconnection between the storage initiator and the storage enclosure.

4. The information handling system of claim 1, wherein the first SEP is operable to verify the status of the second SEP.

5. The information handling system of claim 4, wherein based on the status of the second SEP, the second SEP is operable to:
    detect a failure of the first SEP; and
    control the switching circuitry to connect the second SEP to the first storage controller and to disconnect the first SEP from the first storage controller.

6. The information handling system of claim 1, wherein the first switch and the second switch are I2C switches.

7. The information handling system of claim 1, wherein the first controller is a serial attached SCSI (SAS) controller.

8. The information handling system of claim 7, wherein the first storage controller includes a SAS expander and wherein the first SEP is connected to the SAS expander.

9. The information handling system of claim 1, wherein the first SEP is connected to the first storage controller via an I2C bus.

10. A method, comprising:
    enabling a single storage initiator to access a plurality of storage targets via a first storage controller in a storage enclosure, wherein the first storage controller includes a first storage enclosure processor (SEP);
    enabling the single storage initiator to access the plurality of storage targets via a second storage controller, wherein the second storage controller includes a second SEP; and
    directing a switching circuitry to connect the first storage controller to either the first SEP or the second SEP, wherein the switching circuitry includes a first switch on the first storage controller and a second switch on the second storage controller, wherein the first SEP is operable to assert control signals to the first and second switches and the second SEP is operable to assert control signals to the first and second switches.

11. The method of claim 10, further comprising initiating a storage request directed to the plurality of storage targets.

12. The method of claim 11, further comprising directing the switching circuitry to allow communications between the storage initiator and either of the first and second storage controllers via a single storage interconnection between the storage initiator and the storage enclosure.

13. The method of claim 10, further comprising verifying, by the first SEP, the status of the second SEP.

14. The method of claim 13, wherein based on the status of the second SEP, the second SEP:
    detecting a failure of the first SEP; and
    controlling the switching circuitry to connect the second SEP to the first storage controller and to disconnect the first SEP from the first storage controller.

15. The method of claim 10, wherein the first switch and the second switch are I2C switches.

16. The method of claim 10, wherein the first controller is a serial attached SCSI (SAS) controller.

17. The method of claim 10, wherein the first storage controller includes a SAS expander and wherein the first SEP is connected to the SAS expander.

18. A non-transitory computer readable storage medium comprising instructions, the instructions, when executed by a processor, cause the processor to:
    enable a single storage initiator to access a plurality of storage targets via a first storage controller in a storage enclosure, wherein the first storage controller includes a first storage enclosure processor (SEP);
    enable the single storage initiator to access the plurality of storage targets via a second storage controller, wherein the second storage controller includes a second SEP; and
    direct a switching circuitry to connect the first storage controller to either the first SEP or the second SEP, wherein the switching circuitry includes a first switch on the first storage controller and a second switch on the second storage controller, wherein the first SEP is operable to assert control signals to the first and second switches and the second SEP is operable to assert control signals to the first and second switches.

19. The medium of claim 18, wherein the processor is further caused to initiate a storage request directed to the plurality of storage targets.

20. The medium of claim 19, wherein the processor is further caused to direct the switching circuitry to allow communications between the storage initiator and either of the first and second storage controllers via a single storage interconnection between the storage initiator and the storage enclosure.

* * * * *